F. W. KREMER.
MACHINE FOR FORMING RUBBER TUBES.
APPLICATION FILED MAY 24, 1912.

1,078,099.

Patented Nov. 11, 1913.
3 SHEETS—SHEET 1.

Witnesses

Franklin W. Kremer Inventor
by C. A. Snow & Co.
Attorneys

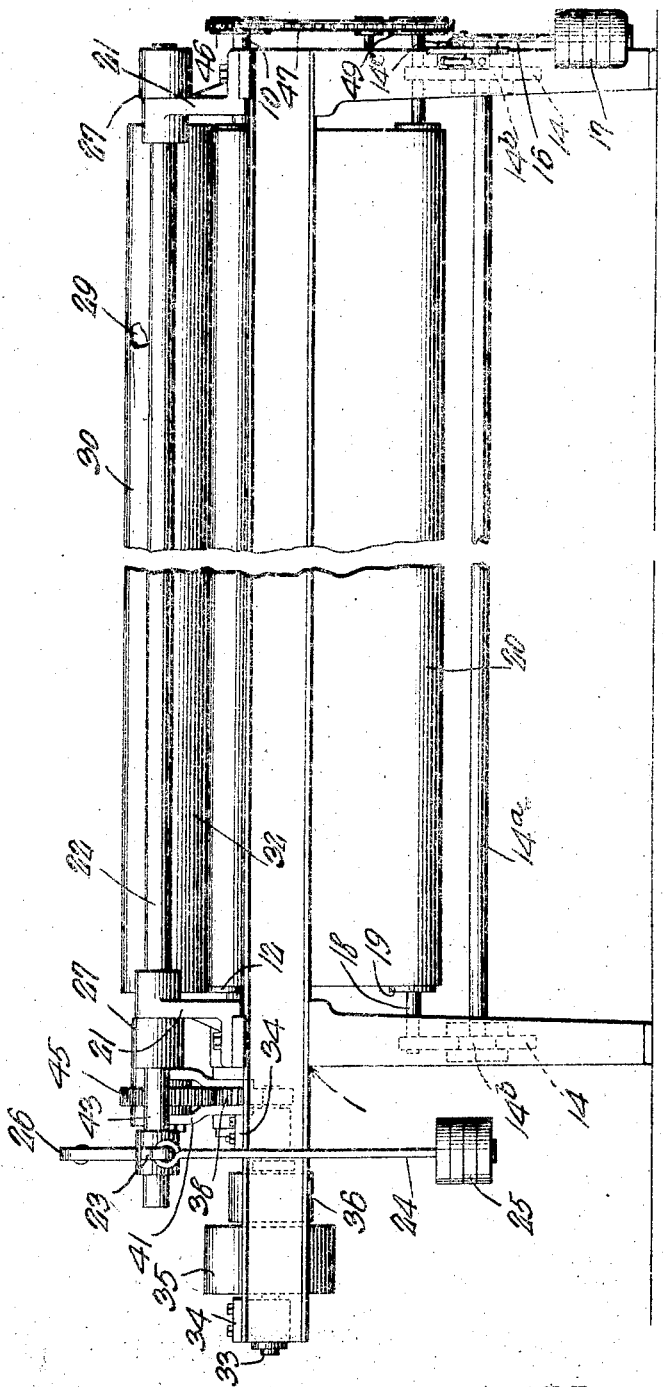

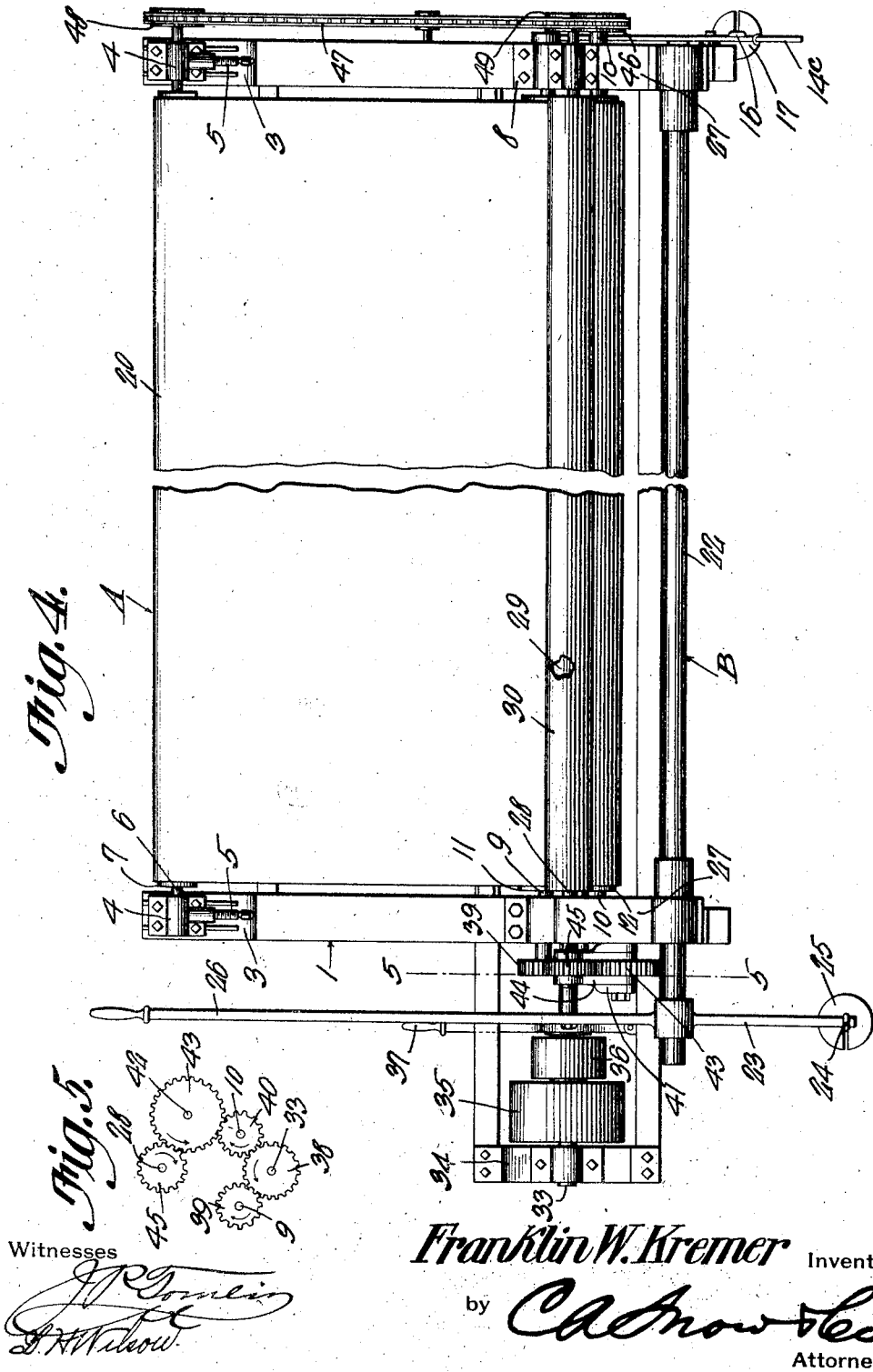

UNITED STATES PATENT OFFICE.

FRANKLIN W. KREMER, OF CARLSTADT, NEW JERSEY.

MACHINE FOR FORMING RUBBER TUBES.

1,078,099.  Specification of Letters Patent.  Patented Nov. 11, 1913.

Application filed May 24, 1912. Serial No. 699,495.

*To all whom it may concern:*

Be it known that I, FRANKLIN W. KREMER, a citizen of the United States, residing at Carlstadt, in the county of Bergen and State of New Jersey, have invented a new and useful Machine for Forming Rubber Tubes, of which the following is a specification.

The machine herein disclosed is adapted for the formation of rubber tubes of the sort commonly employed in the construction of vehicle tires.

In the device forming the subject-matter of this application, a movable carrier is provided for advancing a thin sheet of material against a floating mandrel, the mandrel preferably being yieldably supported by the carrier, means being provided for advancing the carrier and for simultaneously rotating the mandrel, so that when the material is advanced against the mandrel, the material will be wound about the mandrel in a plurality of layers, to form a multi-ply tube.

One object of the present invention is to provide a machine of this type comprising a floating mandrel, so mounted that a perfect tube will be formed thereon, irrespective of irregularities in the outer surface of the mandrel.

Another object of the invention is to provide novel mechanism in which the carrier constitutes a means for yieldably supporting the mandrel.

A further object of the invention is to provide means whereby the tension of the carrier may be adjusted, means being provided for varying the pressure of the mandrel upon the carrier, and for releasing the mandrel, so that the mandrel may be transported out of the machine by the carrier, after the tube-forming process has been completed.

The invention aims to provide novel driving mechanism for advancing the carrier and for rotating the mandrel.

It is within the scope of the invention to provide a carrier and a mandrel, effective by different atmospheric pressure to cause the tube-forming material to adhere to the mandrel, so that the material may be wound around the mandrel, the carrier being operative to advance the material against the mandrel, merely, a retarding, suction action between the material and the carrier being avoided.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
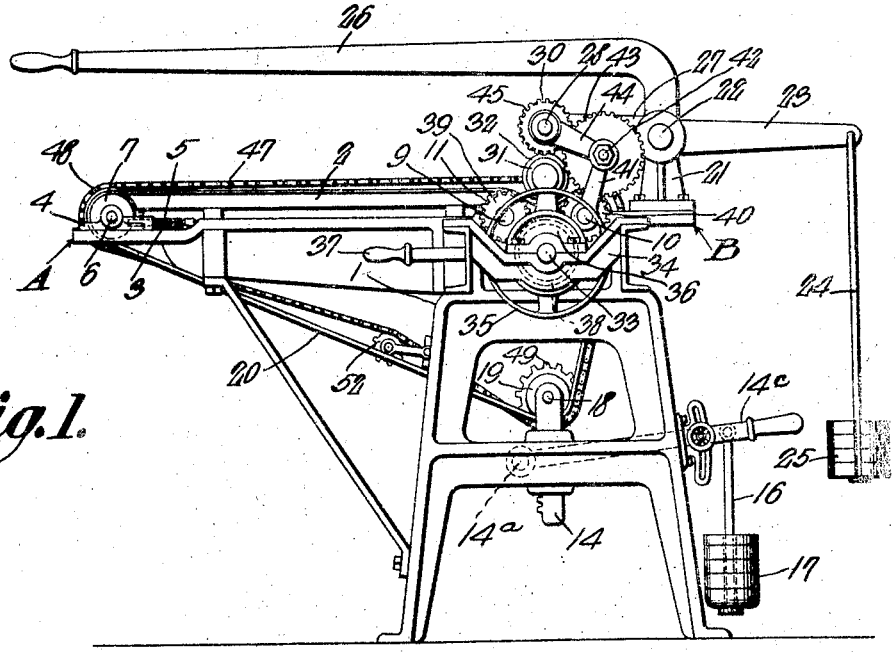
Figure 2:
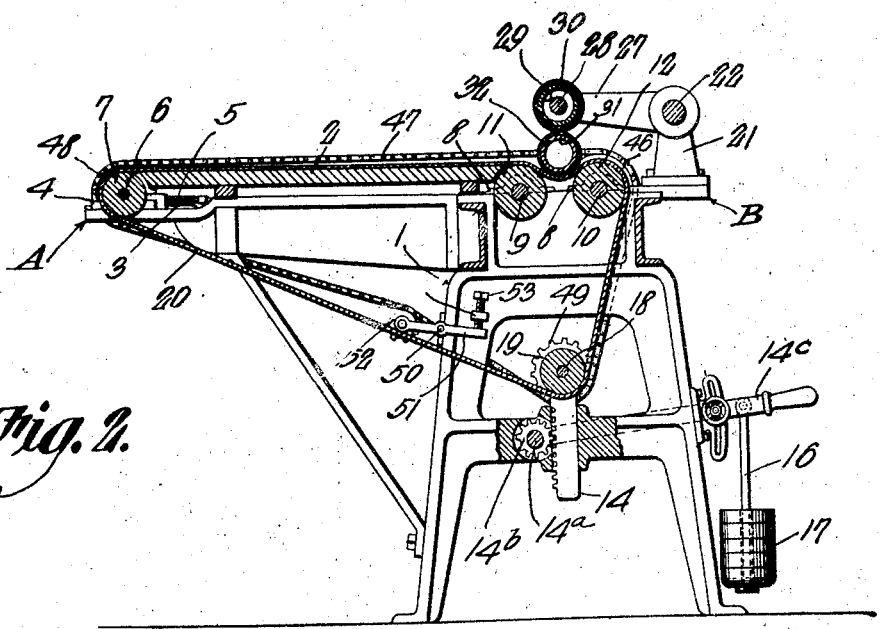

In the drawings,—Figure 1 shows the invention in side elevation; Fig. 2 is a longitudinal section; Fig. 3 is an end elevation; Fig. 4 is a top plan; Fig. 5 is a fragmental section on the line 5—5 of Fig. 4.

The structure herein disclosed comprises, broadly speaking, a frame in which the movable elements are journaled and upheld, a carrier and supporting mechanism therefor, a floating mandrel and mandrel-controlling means, and driving mechanism for advancing the carrier and for rotating the mandrel.

In the drawings, that end of the structure to which the character A is applied will be considered the forward end of the machine, that end of the machine to which the reference character B is applied being considered the rear end of the machine, descriptive terms being selected accordingly, in defining the relative positions of the parts.

*The frame.*—Since the structure upon which the movable elements are upheld and journaled may be varied greatly, without jeopardizing the utility of the invention, this supporting structure will be described briefly as consisting of a frame 1, the forward end of which supports a table 2.

*The carrier and its supporting mechanism.*—The forward end of the frame 1 is provided with tracks 3 upon which bearings 4 are mounted to slide, the sliding movement of the bearings 4 being controlled in the well known manner by means of adjusting screws 5 or the like. Journaled in the bearings 4 is a shaft 6 carrying a roller 7. Supported by the frame 1 adjacent the rear end thereof are bearings 8, of which there are two pairs, one pair of the bearings 8 receiving a shaft 9 and the other pair of bearings 8 receiving a shaft 10. The shaft 9 is provided with a roller 11 and upon the shaft 10 there is a roller 12, the rollers 11 and 12 being spaced at some distance apart, as most clearly discernible in Fig. 2.

Noting particularly Figs. 1 and 2 it will be seen that rack bars 14 are mounted to slide vertically in the frame 1, the rack bars supporting a shaft 18 for rotation, the shaft carrying a roller 19. A shaft 14ª is journaled in the frame 1 and fixed to the shaft are pinions 14ᵇ meshing into the rack bars 14. Projecting from the shaft 14ª is a lever 14ᶜ carrying a pivotally mounted hanger 16 supporting a plurality of individually removable weights 17. Trained about the rollers 7, 11, 12 and 19 is a web 20, hereinafter referred to as the carrier. The constituent material of the web or carrier 20 is a matter of choice, but two considerations are to be borne in mind. First, the web 20 must be fashioned from such material that a thin sheet of rubber will not adhere thereto; and secondly, the web 20 may be porous to permit the passage of air therethrough. With the foregoing in mind, the web 20 is ordinarily fashioned from felt.

*The floating mandrel and the mandrel controlling means.*—Fixed to and upstanding from the rear end of the frame 1 are standards 21 in which a shaft 22 is journaled. Secured to one end of the shaft 22 is a rearwardly projecting arm 23 to which is pivoted a hanger 24, supporting a plurality of individually removable weights 25. Projecting forwardly from the shaft 22, and manually accessible from the forward end of the machine, is a lever 26. Arms 27 extend forwardly from the shaft 22 and overhang the rollers 11 and 12, a shaft 28 being journaled in the arms 27. Secured to the shaft 28 is a roller 29 which may be provided with a resilient facing 30. The roller 29 is adapted to exert pressure upon a tubular, floating mandrel 31, about which is fashioned the tube 32. The mandrel 31 is supported between the rollers 11 and 12, by the yieldable carrier or web 20 and is cradled in a bight of the carrier. The mandrel 31 is thus supported independently of the rollers 11 and 12. The material from which the mandrel 31 is fashioned may be varied. However, the mandrel 31 is commonly fashioned from metal and is impermeable by air.

*The driving mechanism.*—Referring to Fig. 4 and comparing the same with Fig. 1, it is to be noted that a short drive shaft 33 is journaled in saddle bearings 34 secured to one side of the frame 1, the shaft 33 being provided with a pulley 35 or with other suitable means whereby the shaft may be actuated from a prime mover. Interposed in the shaft 33 is a clutch, indicated conventionally at 36 and controlled by a forwardly extended clutch lever 37. Secured to the inner end of the drive shaft 33 is a pinion 38 meshing into a pinion 39 upon the shaft 9 and into a pinion 40 upon the shaft 10. A link 41 is mounted for pivotal movement upon the shaft 10, the link 41 receiving rotatably a shaft 42 provided with a pinion 43. A link 44 connects the shaft 42 with the shaft 28, the extremity of the shaft 28 being provided with a pinion 45 which meshes into the pinion 43. The opposite end of the shaft 10 is provided with a sprocket wheel 46 about which is trained a drive chain 47 engaging a sprocket wheel 48 upon the shaft 6, the drive chain 47 being trained about a sprocket wheel 49 upon the shaft 18.

Referring particularly to Figs. 1 and 2, a means is provided for adjusting the tension of the drive chain 47, this means consisting of a lever 51 fulcrumed intermediate its ends upon the frame 1, the forward end of the lever 51 carrying a sprocket wheel 52 which engages with the lower run of the drive chain 47. A screw 53 is threaded into a lug 54 projecting from the frame 1, and by manipulating the screw 53 the lever 51 may be tilted for the obvious purpose of adjusting the tension of the drive chain 47 through the medium of the sprocket wheel 52.

*Operation.*—A sheet of thin rubber, of much less thickness than the thickness of the wall of the finished tube is placed upon the web or carrier 20 at the forward end of the machine. The sheet of material will be carried rearwardly by the carrier 20, toward the floating mandrel 31, the web 20 exerting little if any pressure upon the table 2. The web or carrier 20 will not adhere or stick to the material, incidentally owing to the fact that the web is fashioned from felt, and also owing to the fact that the web is porous. Owing to the porosity of the web, both the upper and lower faces of the material will be subjected to the same atmospheric pressure, the web exerting no suction action upon the material. When the material travels between the web 20 and the floating mandrel 31, the material will adhere closely to the mandrel. This operation takes place by reason of the fact that the mandrel 31 is not porous. The atmospheric pressure against the outer face of the material will serve to hold the same against the mandrel, there being no counteracting atmospheric pressure against the inner face of the material, since the mandrel is not porous. When the mandrel 31 is rotated, the sheet of material will be wound about the mandrel, forming a tube consisting of a plurality of convolutions, and since the tube is a multiply structure, defective places in the material will not be likely to come into registration, as the material is wound about the mandrel.

The drive is as follows:—From the drive shaft 33, motion is transmitted through the pinion 38 to the pinions 39 and 40, the shafts 9 and 10 being rotated thereby. From the pinion 40 motion will be transmitted to the pinion 43 and from the pinion 43 to the pinion 45, the pinion 45 rotating the shaft 28 and actuating the roller 29. The roller 29, bearing upon the material which is wound about the mandrel 31, will serve to smooth down the material upon the mandrel, as the mandrel is rotated. The tension of the drive chain 47 may be adjusted by shifting the lever 51 in the manner hereinbefore described. The weights 17 actuate the lever 14$^c$ and cause a rotation of the shaft 14$^a$, the pinions 14$^b$ meshing into the rack bars 14, the shaft 18 being moved transversely and the roller 19 being thrust against the web 20, to maintain the same sufficiently taut to uphold the mandrel 31, it being possible to adjust the tension of the web by increasing or decreasing the number of the weights 17. By manipulating the lever 26, the shaft 22 may be rocked, actuating the arm 27 and causing a depression of the roller 29 so that the roller engages the mandrel 31 and thrusts the mandrel against the web 20, thus causing a depression of the web between the rollers 11 and 12.

Attention is directed to the fact that so soon as the lever 26 is manipulated to relieve the pressure of the roller 29 upon the mandrel 31, the mandrel and the finished tube will travel with the web toward the rear end of the frame 1 and ultimately pass off the rear end of the frame.

It frequently happens that the mandrel 31 becomes bowed or sprung, and due to rough handling and other causes, the outer face of the mandrel may not present a truly cylindrical surface. If a defective mandrel be rotated upon a fixed axis, it is impossible to maintain a fixed pressure upon the material when the same is wound upon the mandrel, since the mandrel will move eccentrically about its axis of rotation. In the machine herein disclosed, the use of a defective mandrel will have no effect upon the product, since the mandrel is cradled ("to float" as I have termed the action) upon that portion of the web 20 which lies between the rollers 11 and 12. The web 20 will follow the mandrel and press evenly thereagainst, even though the outer face of the mandrel is not true, the foregoing being peculiarly obvious when it is recalled that the web 20 is yieldably tensioned through the action of the levers 14$^c$ and attendant parts.

Since the material is pressed evenly against the mandrel 31 throughout the entire width of the material, there will be no trapping of air between the constituent convolutions of the finished tube, and as a consequence the tube will be devoid of imprisoned air bubbles, it being well known that such bubbles weaken the tube and often cause a bursting of the tube when the same is heated. It is also to be noted that the rollers 11, 12 and 29 are so geared together that they travel at the same surface speed, with the result that any tendency either to stretch or wrinkle the sheet of rubber is avoided.

Having thus described the invention, what is claimed is:—

1. A rubber tube forming machine having a yielding carrier formed with a bight, a mandrel floating in the bight of the carrier and supported solely thereby, means for driving the carrier, and means, independent of the carrier, for holding the mandrel in the bight and driving it at the same surface speed as the carrier.

2. A rubber tube forming machine having a porous and yielding carrier formed with a bight, an impervious mandrel floating in the bight of said carrier and supported solely thereby, means for driving the carrier, and means, independent of the carrier, for holding said mandrel in said bight and driving it at the same surface speed as the carrier.

3. A rubber tube forming machine having spaced rollers, a yielding carrier movable over said rollers and having a bight therebetween, a mandrel floating in said bight and supported by said carrier, a third roller movable into and out of contact with said mandrel for holding it in said bight and driving it at the same surface speed as said carrier, and means for driving all of said rollers at the same speed.

4. A rubber tube forming machine having a table, a pair of spaced carrier rollers adjacent said table, a yielding carrier movable over said table and said rollers and having a bight between said rollers, a mandrel floating in said bight and supported solely by said carrier, and a flexible-faced driving roller, movable into and out of contact with said mandrel for holding the same in said bight, and driving it at the same surface speed as said carrier, means for adjusting the tension of said carrier, and means for driving said carrier rollers and said driving roller at the same surface speed.

5. A rubber tube forming machine comprising a table, a forward carrier roller in advance of the table, spaced rearward carrier rollers in rear of the table, a lower carrier roller, a yielding and porous carrier extending around all of said rollers and across said table, and having a bight between said rearward spaced carrier rollers, a mandrel floating in said bight and supported solely by said carrier on the lower portion only of its circumference, a soft-faced driving roller for holding said mandrel in said bight and driving it at the same surface speed as said carrier, mechanism for moving said soft-faced roller into and out of engagement with said mandrel, means for varying the pressure of said soft-faced roller on said mandrel, means for adjusting the tension of said carrier, and means for driving all of said carrier rollers and said driving roller at the same surface speed.

In testimony that I claim the foregoing as my own, I have hereto affixed my signature in the presence of two witnesses.

FRANKLIN W. KREMER.

Witnesses:
 FRANK DE WITT,
 C. D. NIXON.